June 9, 1925.
T. H. NELSON
TOOL
Filed Nov. 25, 1924    2 Sheets-Sheet 1
1,541,733
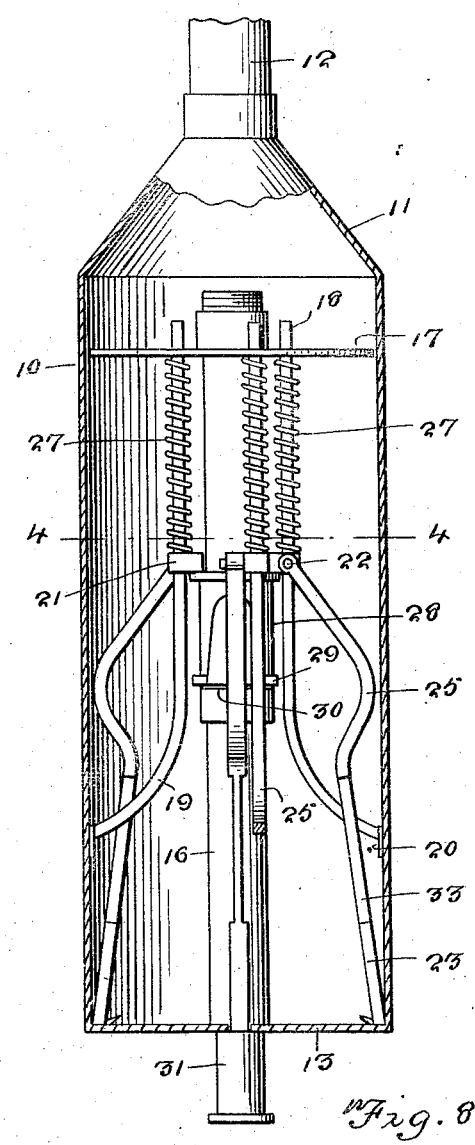
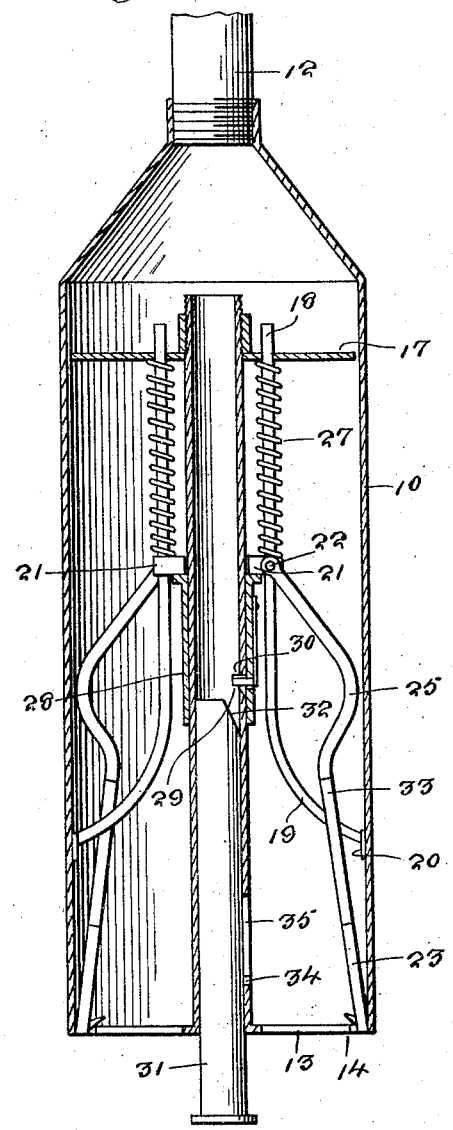
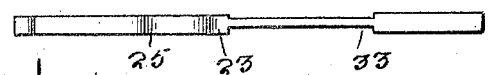
T. H. Nelson
INVENTOR June 9, 1925.  T. H. NELSON  1,541,733
TOOL
Filed Nov. 25, 1924   2 Sheets-Sheet 2.
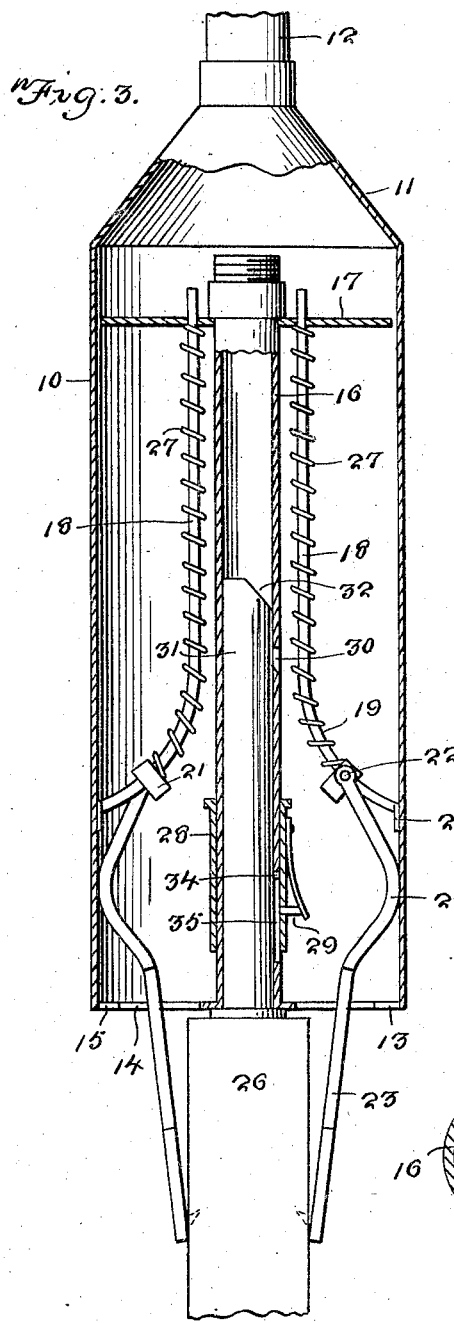
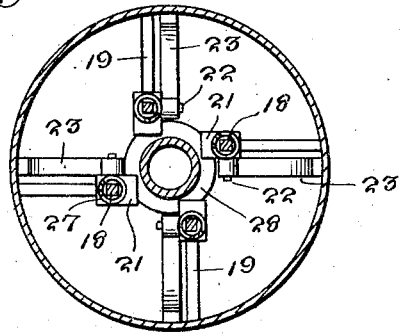
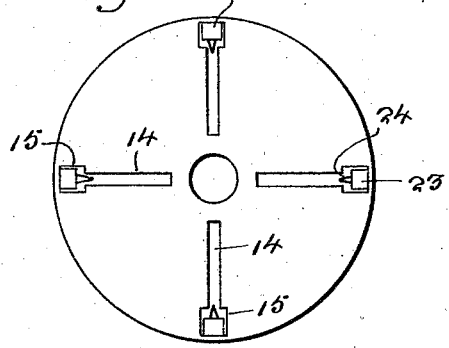
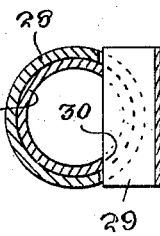
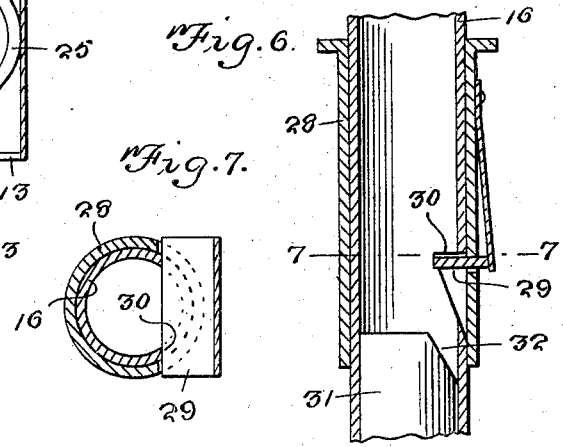
T. H. Nelson
INVENTOR
BY Victor J. Evans
ATTORNEY Patented June 9, 1925.

UNITED STATES PATENT OFFICE.

THOMAS H. NELSON, OF COALINGA, CALIFORNIA.

TOOL.

Application filed November 25, 1924. Serial No. 752,249.

*To all whom it may concern:*

Be it known that I, THOMAS H. NELSON, a citizen of the United States, residing at Coalinga, in the county of Fresno and State of California, have invented new and useful Improvements in Tools, of which the following is a specification.

This invention relates to well fishing tools and has for an object to provide a tool which may be lowered into a well for the recovery of lost articles, means being included in the tool for automatically operating a plurality of grab hooks, so that when the tool contacts an article, the hooks will be moved into engaging position.

Another object of the invention is the provision of a tool of the above character which is simple in construction, positive in operation and may be used upon either standard or rotary drills.

With the above and other objects in view, the invention further includes the following novel features and details of construction, to be hereinafter more fully described, illustrated in the accompanying drawings and pointed out in the appended claims.

In the drawings:—

Figure 1 is a side elevation of a tool constructed in accordance with the invention, the casing of the tool being shown in section and the hooks in their normal position.

Figure 2 is a vertical sectional view of the same.

Figure 3 is a view similar to Figure 2 showing the hooks in an active position.

Figure 4 is a section on the line 4—4 of Figure 1.

Figure 5 is a bottom plan view of the tool with the parts in the position shown in Figures 1 and 2.

Figure 6 is an enlarged fragmentary section showing the holding sleeve in its active position.

Figure 7 is a section on the line 7—7 of Figure 6.

Figure 8 is an edge view of one of the grab hooks.

Referring to the drawings in detail wherein like characters of reference denote corresponding parts, the reference character 10 indicates a cylindrical casing which is tapered at one end as at 11 and has a detachable connection with the string of a well drilling apparatus of either the standard or rotary type, a portion of the string being indicated at 12. The opposite end of the casing 10 is closed as at 13 and this closed end is provided with a plurality of slots 14, the outer ends of which are enlarged as at 15.

Extending upwardly from the bottom 13 of the casing is a tubular guide 16 and supported upon the outer end of this guide is a plate or disk 17. This plate or disk is provided with a plurality of openings and extending through each opening is a guide rod 18. These rods extend downwardly and laterally as shown at 19 and have their lower ends secured to the inner walls of the casing as at 20.

Mounted for movement upon the guide rods 18 are slide blocks 21 and pivotally secured to these blocks as shown at 22 are the inner ends of grab hooks 23, the bills 24 of these hooks being normally disposed within the enlarged portions 15 of the slots 14. The hooks 23 are provided with offset portions 25 which, when the hooks are moved downward will engage the inner walls of the cylindrical casing 10, this engagement being due to the curved portion 19 at the lower ends of the guide rods 18. The bill ends 24 of the hooks will thus be forced inward toward the center of the casing and be caused to engage an object as illustrated at 26 in Figure 3 of the drawings.

The hooks are forced longitudinally under the influence of springs 27 which surround the rods and which bear against the slide blocks 21 and the disks 18. The hooks are held against longitudinal outward movement by means of a flanged sleeve 28 which is mounted for sliding movement upon the central tubular guide 16. The sleeve is held against movement by means of a spring latch 29 which engages the walls of an opening 30 provided in the guide 16.

In order to disengage the latch and release the hooks there is provided a trigger 31. This trigger is movable within the tubular guide 16 and its inner end is provided with a beveled portion 32 which is adapted to engage the inner edge of the latch 35 and force the latter outward so as to release the collar 28. The grab hooks 23 will then be moved longitudinally outward under the influence of their springs, engagement of the offset portions 25 with the inner walls of the casing causing the bill ends of the hooks to move laterally inward toward one another. The hooks 23 are provided with a restricted portion 33 which operates in the slots 14. The trigger 31 is held against rotary movement within the tubular guide 16 by means of a pin 34 which operates in the slot 35 provided in the tubular guide 16.

The invention is susceptible of various changes in its form, proportions and minor details of construction and the right is herein reserved to make such changes as properly fall within the scope of the appended claims.

Having described the invention what is claimed is:—

1. A well fishing tool comprising a casing, a centrally located longitudinally disposed guide within the casing, downwardly and laterally disposed guides within the casing around the central guide, hooks normally disposed within the casing, means for slidingly connecting the hooks and guides, spring means for forcing the hooks longitudinally without the casing, means for forcing the outer ends of the hooks inward toward one another during their longitudinal movement, means for holding the hooks against longitudinal outward movement and means for automatically releasing the hook holding means.

2. A well fishing tool comprising a casing, a centrally located longitudinally disposed guide within the casing, downwardly and laterally disposed guides within the casing around the central guide, hooks normally disposed within the casing, means for slidingly connecting the hooks and guides, spring means for forcing the hooks longitudinally without the casing, means for forcing the outer ends of the hooks inward toward one another during their longitudinal movement, means for holding the hooks against longitudinal outward movement and a longitudinally movable trigger extending beyond the outer end of the casing for automatically releasing the hook holding means.

3. A well fishing tool comprising a casing, a centrally located longitudinally disposed guide within the casing, downwardly and laterally disposed guides within the casing around the central guide, hooks normally disposed within the casing, means for slidingly connecting the hooks and guides, spring means for forcing the hooks longitudinally without the casing, offset portions included in the casing and engaging the walls of the casing for forcing the outer ends of the hooks inward toward one another during their longitudinal movement, means for holding the hooks against longitudinal outward movement and means for automatically releasing the hook holding means.

4. A well fishing tool comprising a casing, a centrally located longitudinally disposed guide within the casing, downwardly and laterally disposed guides within the casing around the central guide, hooks normally disposed within the casing, means for slidingly connecting the hooks and guides, spring means for forcing the hooks longitudinally without the casing, means for forcing the outer ends of the hooks inward toward one another during their longitudinal movement, a sleeve slidingly mounted upon the central guide in the path of the sliding hook and guide connecting means, for holding the hooks against longitudinal outward movement, a latch carried by the sleeve and engaging the central guide and a trigger movable longitudinally of the central guide and engaging the latch to release the sleeve.

In testimony whereof I affix my signature.

THOMAS H. NELSON.